United States Patent [19]

Nakao et al.

[11] Patent Number: 5,073,602

[45] Date of Patent: Dec. 17, 1991

[54] THERMOSETTING RESIN COMPOSITION

[75] Inventors: Yasushi Nakao; Mitsuhiro Fukuda; Motoshi Yabuta, all of Hiratsuka, Japan

[73] Assignee: Kansai Paint Co., Ltd., Hyogo, Japan

[21] Appl. No.: 671,927

[22] Filed: Mar. 20, 1991

[30] Foreign Application Priority Data

Mar. 20, 1990 [JP] Japan .................... 2-68191

[51] Int. Cl.$^5$ .............. C08L 61/00; C08L 61/20; C08L 33/02; C08K 5/07
[52] U.S. Cl. .................... 525/155; 525/221; 525/514; 525/519
[58] Field of Search ............... 525/519, 514, 155, 221

[56] References Cited

U.S. PATENT DOCUMENTS

| | | | |
|---|---|---|---|
| 3,928,492 | 12/1975 | Fang | 525/519 |
| 3,953,643 | 4/1976 | Cheung et al. | 525/155 |
| 4,314,918 | 2/1982 | Birkmeyer et al. | 525/519 |

FOREIGN PATENT DOCUMENTS

| | | | |
|---|---|---|---|
| 473734 | 6/1968 | Japan . | |
| 0045760 | 3/1980 | Japan | 525/519 |
| 1113087 | 10/1986 | Japan . | |
| 62-018479 | 1/1987 | Japan | 525/155 |
| 1139655 | 11/1987 | Japan . | |

Primary Examiner—Melvyn I. Marquis
Assistant Examiner—W. R. H. Clark
Attorney, Agent, or Firm—Wenderoth, Lind & Ponack

[57] ABSTRACT

A thermosetting resin composition comprising as main components (A) an acrylic resin containing in the molecule a carboxyl group, a hydroxyl group and an epoxy group and having an acid value of 15–150 mg KOH/g, a hydroxyl value of 30 mg KOH/g or more, an epoxy equivalent of 3,000–15,000 and a number-average molecular weight of 3,000–30,000, (B) an acrylic resin containing in the molecule a carboxyl group, a hydroxyl group and an epoxy group and having an acid value of 2–10 mg KOH/g, a hydroxyl value of 30 mg KOH/g or more, an epoxy equivalent of 250–2,500 and a number-average molecular weight of 3,000–30,000 and (C) an amino resin, wherein the molar ratio of the carboxyl group of the component (A)/the epoxy group of the component (B) is 1/0.5 to 0.5/1 and the amount of the component (C) is 10–40% by weight based on the total amount of the components (A) to (C). The resin composition is useful for use particularly in top coat paint composition for automobile outer panels.

15 Claims, No Drawings

THERMOSETTING RESIN COMPOSITION

The present invention relates to a thermosetting resin composition which can form a film excellent in properties such as acid resistance, solvent resistance, water resistance, final appearance and the like and which is useful for use particularly in top coat paint composition for automobile outer panels.

Acrylic resin-melamine resin compositions, polyester resin-melamine resin compositions, etc. have been widely used as a top coat paint composition for automobiles because they can be used in one pack and can form a film excellent in weather resistance, solvent resistance and final appearance. This film, however, has insufficient resistance to acid rain (pH: 2-5) caused by air-polluting substances which are posing problems on a global scale, such as sulfur oxides, nitrogen oxides and the like.

Meanwhile, urethane paints using a polyisocyanate compound as a crosslinking agent show acid resistance but have drawbacks in that they are used in two packs making the handling inconvenient and moreover the polyisocyanate compound has strong toxicity. Use, as a crosslinking agent, of a blocked polyisocyanate compound obtained by blocking said polyisocyanate compound can solve the above drawbacks; however, the blocked polyisocyanate compound has a high dissociation temperature making insufficient the film curing in automobile coating lines when the current baking temperature (140°-150° C.) is employed, and the film easily causes thermal yellowing depending upon the type of the blocking agent.

Resin compositions for use in paints, comprising a carboxyl group-containing resin and an epoxy group-containing resin are also known. These compositions give a film of excellent acid resistance but are inferior to the above-mentioned compositions in solvent resistance.

Further, resin compositions comprising a carboxyl group-containing resin, an epoxy group-containing resin and a melamine resin have been proposed recently (Japanese Laid-Open Patent Publication Nos. 113087/1988 and 139655/1989). These compositions, however, have low compatibility between component resins when each individual resin contains a large amount of a functional group in the molecule in order to allow the resin (resultantly the resulting composition) to have improved acid resistance, solvent resistance, etc.

Meanwhile, resin compositions for use in paints, comprising a resin having a carboxyl group, an epoxy group and a hydroxyl group in the molecule and a melamine resin are also known (Japanese Patent Publication No. 3734/1972). In these compositions, however, introduction of a large amount of said functional groups in the former resin in order to obtain a film improved in acid resistance, etc. tends to cause gelation during the polymerization, is difficult to synthesize the resin, and gives insufficient long-term storage stability.

The present inventors made research in order to solve the above problems and found a thermosetting resin composition capable of giving a film excellent particularly in acid resistance. The present invention has been completed based on the finding.

According to the present invention there is provided a thermosetting resin composition comprising as main components (A) an acrylic resin containing in the molecule a carboxyl group, a hydroxyl group and an epoxy group and having an acid value of 15-150 mg KOH/g, a hydroxyl value of 30 mg KOH/g or more, an epoxy equivalent of 3,000-15,000 and a number-average molecular weight of 3,000-30,000, (B) an acrylic resin containing in the molecule a carboxyl group, a hydroxyl group and an epoxy group and having an acid value of 2-10 mg KOH/g, a hydroxyl value of 30 mg KOH/g or more, an epoxy equivalent of 250-2,500 and a number-average molecular weight of 3,000-30,000, and (C) an amino resin, wherein the molar ratio of the carboxyl group of the component (A)/the epoxy group of the component (B) is 1/0.5 to 0.5/1 and the amount of the component (C) is 10-40% by weight based on the total amount of the components (A) to (C).

The composition of the present invention has excellent compatibility not only between the component (A) and the component (B) but also between the components (A) and (B) and the component (C) because both of the component (A) and the component (B) have a carboxyl group, and further can give a film excellent in acid resistance, solvent resistance, weather resistance, final appearance, etc.

The component (A) resin has a high content of a carboxyl group but a low content of an epoxy group, while the component (B) resin has a high content of an epoxy group but a low content of a carboxyl group. Therefore, during the production (polymerization) of the component (A) or (B) resin there occurs substantially no gelation or no excessive polymerization due to the reaction between the carboxyl group and the epoxy group. Further, since no isocyanate compound as a crosslinking agent is used in the present invention, there is seen no problems as mentioned above due to the use of an isocyanate compound.

Detailed description is hereinafter made on the composition of the present invention.

Component (A)

This is an acrylic resin containing in the molecule three functional groups, i.e. a carboxyl group, a hydroxyl group and an epoxy group and having an acid value of 15-150 mg KOH/g, a hydroxyl value of 30 mg KOH/g or more, an epoxy equivalent of 3,000-15,000 and a number-average molecular weight of 3,000-30,000.

The acrylic resin the component (A) having the above properties can be obtained by, for example, copolymerizing a carboxyl group-containing monomer, a hydroxyl group-containing monomer, an epoxy group-containing monomer (these three monomers are essential monomers) and, as necessary, other monomer.

The carboxyl group-containing monomer is preferably a polymerizable monomer having in the molecule at least one carboxyl group, preferably one or two carboxyl groups and one polymerizable unsaturated bond, particularly a carboxyl group-containing acrylic monomer. Preferable specific examples of the monomer are acrylic acid and methacrylic acid. Besides, there can also be used, for example, maleic acid, maleic anhydride, itaconic acid and their monoesters. These monomers can be used alone or in combination of two or more.

The hydroxyl group-containing monomer is preferably a polymerizable monomer having in the molecule at least one hydroxyl group, preferably one hydroxyl group and one polymerizable unsaturated bond, particularly a hydroxyl group-containing acrylic monomer.

As the monomer, there can be specifically mentioned, for example, $C_2$-$C_{12}$ hydroxyalkyl (meth)acrylates such as hydroxyethyl (meth)acrylate, hydroxypropyl (meth)acrylate, hydroxybutyl (meth)acrylate and the like; 1,4-butanediol mono(meth)acrylate: addition products between hydroxyalkyl (meth)acrylate [e.g. hydroxyethyl (meth)acrylate]and ε-caprolactone; and addition products between hydroxyalkyl (meth)acrylate e.g. hydroxyethyl (meth)acrylate] and alkylene oxide (e.g. ethylene oxide, propylene oxide). These monomers can be used alone or in combination of two or more. Of them, hydroxyalkyl (meth)acrylates are particularly preferable.

The epoxy group-containing monomer is preferably a polymerizable monomer having in the molecule at least one epoxy group (or glycidyl group), preferably one such group and one polymerizable unsaturated bond, particularly an epoxy group-containing acrylic monomer. Specific examples include glycidyl methacrylate, glycidyl acrylate, methylglycidyl methacrylate, methylglycidyl acrylate and allylglycidyl ether. These monomers can be used alone or in combination of two or more. Glycidyl (meth)acrylate is particularly preferable.

The other monomer copolymerizable with the above monomers is preferably a monomer which contains none of the carboxyl group, the hydroxyl group and the epoxy group but which contains one polymerizable unsaturated bond and can copolymerize with the above monomers. As the other monomer, there can be specifically mentioned acrylic acid or methacrylic acid esters, for example, $C_1$-$C_{22}$ alkyl (meth)acrylates such as methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, stearyl (meth)acrylate, tridecyl (meth)acrylate and the like; cycloalkyl (meth)acrylates such as cyclohexyl (meth)acrylate and the like; aralkyl (meth)acrylates such as benzyl (meth)acrylate, phenethyl (meth)acrylate and the like; aryl (meth)acrylates such as phenyl (meth)acrylate and the like; and di(alkyl)aminoalkyl (meth)acrylates such as dimethylaminoethyl (meth)acrylate, diethylaminoethyl (meth)acrylate, diethylaminopropyl (meth)acrylate and the like. There can further be used vinyl aromatic compounds (e.g. styrene, α-methylstyrene, vinyltoluene), acrylonitrile, methacrylonitrile, vinyl acetate, vinyl propionate, acrylamide, methacrylamide, methylolacrylamide, methylolmethacrylamide, vinyl chloride, propylene, ethylene, $C_4$-$C_{20}$ α-olefins, etc.

In the component (A), the proportions of the individual monomers are determined so that the copolymer (the acrylic resin) obtained from the monomers has an acid value, a hydroxyl value and an epoxy equivalent each falling in the above-mentioned range. The copolymerization reactions between the monomers can be effected according to ordinary methods, for example, any of known polymerization methods such as solution polymerization, suspension polymerization, bulk polymerization, emulsion polymerization and the like. In this case, there can be used a polymerization initiator such as azobisisobutyronitrile, 4,4'-azobis(4-cyanopentanoic acid), benzoyl peroxide, tert-butylperoxy 2-ethylhexanoate, cumene hydroperoxide, potassium persulfate, hydrogen peroxide, 2,2'-azobis2-methyl-N-(2-hydroxyethyl)-propionamide]or the like. There can also be used, as necessary, a chain transfer agent such as dodecyl mercaptan, mercaproethanol, α-methylstyrene dimer or the like.

The reaction temperature is conveniently about 70-about 130° C., preferably about 70-about 110° C. in order to avoid the reaction between the carboxyl group and the epoxy group. The resulting acrylic resin the component (A)]can have an acid value of 15-150 mg KOH/g, preferable 50-120 mg KOH/g, more preferably 60-120 mg KOH/g. When the acid value is smaller than 15 mg KOH/g, the reactivity of the acrylic resin with the epoxy group of the component (B) is generally low and the resulting resin composition gives a film of low acid resistance. When the acid value is larger than 150 mg KOH/g, the acrylic resin has low solvent solubility and low compatibility with the component (B). The acrylic resin is required to have a hyroxyl value of 30 mg KOH/g or more, preferably 35-100 mg KOH/g, more preferably 40-85 mg KOH/g. When the hydroxyl value is smaller than 30 mg KOH/g, the cross-linking reactivity of the acrylic resin with the component (C) is low. The acrylic resin can have an epoxy equivalent of 3,000-15,000, preferably 3,200-9,000, more preferably 3,200-8,000. When the epoxy equivalent is larger than 15,000, the acrylic resin has low compatibility with the component (C). When the epoxy equivalent is smaller than 3,000, the reaction between the carboxyl group and the epoxy group proceeds during the synthesis of the component (A), which tends to cause gelation and excessive polymerization. The number-average molecular weight of the component (A) can be in a range of 3,000-30,000, preferably 5,000-20,000, more preferably 6,000-15,000. When the number-average molecular weight of the component (A) resin is smaller than 3,000, the resulting resin composition generally gives a film of low weather resistance and low water resistance. When the number-average molecular weight is larger than 30,000, the composition tends to give deterioration in final appearance, etc.

Incidentally, in the present specification, the number-average molecular weight of resin refers to a number-average molecular weight in terms of polystyrene as measured by gel permeation chromatography (GPC).

Component (B)

This is an acrylic resin containing in the molecule three functional groups, i.e. a carboxyl group, a hydroxyl group and an epoxy group and having an acid value of 2-10 mg KOH/g, a hydroxyl value of 30 mg KOH/g or more, an epoxy equivalent of 250-2,500 and a number-average molecular weight of 3,000-30,000.

The acrylic resin [the component (B) having the above properties can be obtained by, for example, copolymerizing a carboxyl group-containing monomer, a hydroxyl group-containing monomer, an epoxy group-containing monomer (these three monomers are essential monomers) and, as necessary, other monomer. Each of the monomers is preferably used by selecting one or more monomers from those specifically mentioned with respect to the component (A). The proportions of the individual monomers are determined so that the resulting acrylic resin the component (B)) has an acid value, a hydroxyl value and an epoxy equivalent each falling in the above-mentioned range. The copolymerization of the monomers can be effected in the same method as mentioned for the component (A).

In the acrylic resin as the component (B), the acid value is in a range of 2-10 mg KOH/g, preferably 3-9 mg KOH/g, more preferably 4-8 mg KOH/g. When the acid value is smaller than 2, the compatibility of the acrylic resin with the component (A) is generally low. When the acid value is larger than 10, the reaction between the carboxyl group and the epoxy group proceeds during the synthesis of the component (B), which tends to cause gelation and excessive polymerization. The hydroxyl value of the acrylic resin is 30 mg KOH/g or more, preferably 35-100 mg KOH/g, more preferably 40-85 mg KOH/g. When the hydroxyl value is smaller than 30 mg KOH/g, the cross-linking reactivity of the acrylic resin with the component (C) tends to be low.

The epoxy equivalent of the acrylic resin is desirably 250-2,500, preferably 300-1,500, more preferably 400-1,000. When the epoxy equivalent is larger than 2,500, the reactivity with the carboxyl group is generally low and the resulting resin composition gives a film of low acid resistance. When the epoxy equivalent is smaller than 250, the compatibility of the acrylic resin with the component (A) tends to be low.

The acrylic resin the component (B)1 can have a number-average molecular weight of 3,000-30,000, preferably 5,000-20,000, more preferably 6,000-15,000. When the number average molecular weight is smaller than 3,000, the resulting resin composition generally gives a film of low weather resistance and low water resistance. When the number-average molecular weight is larger than 30,000, the resin composition tends to give a film low in final appearance, etc.

Component (C)

This is an amino resin. The amino resin includes, for example, a methylolaminoresin obtained by the synthesis of (a) at least one compound of melamine, urea, benzoguanamine, etc. and (b) formaldehyde. As the aminoresin, there can also be used those compounds obtained by reacting the methylolaminoresin with a lower monohydric alcohol (e.g. methanol, ethanol, propanol, isopropanol, butanol) to subject part or the whole of the methylol group of the resin to alkyl etherification.

The composition of the present invention can be prepared by mixing the components (A), (B) and (C). In the mixing, water and/or an organic solvent can be used as a solvent or a dispersing agent.

The proportions of the components (A), (B) and (C) are not strictly restricted, and can vary depending upon the type of each component, the application of the composition, etc. Generally, the proportions of the components (A) and (B) can be determined so that the molar ratio of the carboxyl group of the component (A)/the epoxy group of the component (B) is generally 1/0.5 to 0.5/1, preferably 1/0.6 to 0.6/1, more preferably 1/0.7 to 0.7/1. When the proportions deviate from the above range, the composition tends to give a film of low solvent resistance and low adhesion. The proportion of the component (C) can be 10-40% by weight, preferably 15-30% by weight, more preferably 17-30% by weight based on the total amount of the components (A), (B) and (C). When the proportion of the component (C) is smaller than 10% by weight, the cross-linking reaction between the component (C) and the hydroxyl groups of the components (A) and (B) is generally insufficient and the composition tends to give a film of low solvent resistance. When the proportion of the component (C) is larger than 40% by weight, the composition tends to give a film of poor acid resistance.

Preferably, the composition of the present invention is used by dissolving or dispersing the components (A), (B) and (C) in an organic solvent and/or water. As the organic solvent, there can be used organic solvents ordinarily used in paints, such as hydrocarbons (e.g. hexane, octane, toluene, xylene, cyclohexane) and their halogenated products, alcohol solvents e.g. methanol, ethanol, butanol), ether solvents (e.g. diethyl ether, butyl cellosolve), ketone solvents (e.g. acetone, methyl ethyl ketone, isophorone) and ester solvents (e.g. ethyl acetate, butyl acetate).

Into the composition of the present invention can further be added, as necessary, a curing catalyst, a viscosity-adjusting agent (e.g. organic montmorillonite, microgel, polyamide resin), a coating surface modifier (e.g. silicon-based resin, acrylic resin), an ultraviolet absorber, a blocked polyisocyanate compound, a color pigment, a metallic pigment, an interference pigment, etc. all in ordinary amounts.

With respect to the curing catalyst used in the composition of the present invention, as the curing catalyst for accelerating the cross-linking reaction between the amino resin as the component (C) and the hydroxyl groups of the components (A) and (B), there can be advantageously used, for example, phosphoric acid type catalysts such as dibutyl phosphate and the like and amine-blocking strong acid catalysts such as dodecylbenzenesulfonic acid, paratoluenesulfonic acid and the like. As the curing catalyst for accelerating the cross-linking reaction between the carboxyl group and the epoxy group in the component (A) and the component (B), there can be suitably used, for example, quaternary ammonium salts (e.g. tetrabutylamminoum chloride) and quaternary phosphonium salts (e.g. tetraphenylphosphonium chloride).

The composition of the present invention can be used as a resin for paints. It is most suitable for use as a top coat paint for outer panels of automobiles, motorcycles, buses, household electric appliances, office machines, etc. and can be used as a solid color paint, a metallic paint and a clear paint.

The present invention is hereinafter described more specifically by way of Production Examples and Examples. In the followings, parts and % are by weight unless otherwise specified.

I. Production Examples (1) Production of components (A)

450 parts of xylene ane 150 parts of n-butanol were fed into a four-necked flask provided with a stirrer, a thermometer, a condenser and a nitrogen-introducing tube, and the mixture was heated to 100° C. Thereto were dropwise added the monomers shown in Table 1, in 4 hours. Then, the resulting mixture was kept at 100° C. for hours. Thereafter, the mixture was diluted with 400 parts of xylol to obtain an acrylic copolymers (a-1) to (a-4) each having a solid content of 50%.

(2) Production of components (B)

300 parts of xylene and 300 parts of n-butanol were fed into the same reactor as used in the production of the component (A). The mixture was heated to 100° C. Thereto were dropwise added the monomers shown in Table 1, in 4 hours. The resulting mixture was kept at 100° C. for 2 hours. Thereafter, the mixture was diluted with 400 parts of xylol to obtain acrylic copolymers (b-1) to (b-4) each having a solid content of 50%.

TABLE 1

| Monomers | Component (A) | | | | Component (B) | | | |
|---|---|---|---|---|---|---|---|---|
| | (a-1) | (a-2) | (a-3) | (a-4) | (b-1) | (b-2) | (b-3) | (b-4) |
| Styrene | 200 | | 150 | 150 | | 200 | 100 | |
| n-Butyl methacrylate | 380 | 400 | 480 | | 345 | 345 | | 300 |
| n-Butyl acrylate | | 310 | | 560 | 100 | | 490 | 394 |
| 2-Ethylhexyl acrylate | 150 | | 100 | | 200 | | 100 | |
| 2-Hydroxyethyl acrylate | 150 | 150 | | | 150 | 150 | | |
| 2-Hydroxyethyl methacrylate | | | 100 | 100 | | | 100 | 100 |
| Acrylic acid | 100 | 100 | 150 | | 5 | 5 | 10 | |
| Methacrylic acid | | | | 170 | | | | |
| Glycidyl methacrylate | 20 | 40 | 20 | 0 | 200 | 300 | 200 | 200 |
| AIBN | 40 | 20 | 20 | 40 | 40 | 20 | 20 | 40 |
| Mercaptoethanol | | 5 | 5 | | | 5 | 5 | |
| Acid value (mg KOH/g) | 78 | 78 | 118 | 111 | 4.0 | 4.0 | 8.0 | 0 |
| Hydroxyl value (mg KOH/g) | 73 | 73 | 43 | 43 | 73 | 73 | 43 | 43 |
| Epoxy equivalent | 7,100 | 3,550 | 7,100 | 0 | 710 | 473 | 710 | 710 |
| Number-average molecular weight | 12,000 | 10,000 | 9,000 | 13,000 | 12,000 | 9,500 | 10,000 | 12,500 |

II. Examples and Comparative Examples

The component (A) and the component (B) produced in Production Examples were mixed with an amino resin [a component (C)], etc. The mixture was adjusted in viscosity to prepare top coat paints for automobiles.

Example 1

Clear paint (C-1)

| | |
|---|---|
| Acrylic copolymer (a-1) | 80 parts |
| Acrylic copolymer (b-1) | 80 parts |
| 60% UVAN 20SE (butyl-etherified methylol-melamine manufactured by MITSUI TOATSU CHEMICALS, INC.) | 30 parts |
| Surface modifier (BYK-300 manufactured by BYK CHEMIE) | 0.1 part |
| Ultraviolet absorber (TINUVIN 900 manufactured by CIBA GEIGY) | 1.0 part |

The above mixture was diluted with SWASOL 1,000 so that the resulting mixture had a viscosity of 25 seconds at 20° C. when measured by Ford cup No. 4.

Example 2

Clear paint (C-2)

| | |
|---|---|
| Acrylic copolymer (a-2) | 90 parts |
| Acrylic copolymer (b-2) | 70 parts |
| CYMEL 303 (fully methyl-etherified methylol-melamine manufactured by MITSUI CYANAMIDE) | 20 parts |
| NACURE 5225 (neutralization product of dodecylbenzensulfonic acid with amide manufactured by KING INDUSTRIES) | 2 parts |
| Surface modifier (BYK-300) | 0.1 part |
| Ultraviolet absorber (TINUVIN 900) | 1.0 part |

The above mixture was treated in the same manner as in Example 1.

Example 3

Clear paint (C-3)

| | |
|---|---|
| Acrylic copolymer (a-3) | 80 parts |
| Acrylic copolymer (b-3) | 80 parts |
| 60% UVAN 20SE | 20 parts |
| Surface modifier (BYK-300) | 0.1 part |
| Ultraviolet absorber (TINUVIN 900) | 1.0 part |
| Tetrabutylammonium chloride | 0.05 part |

The above mixture was treated in the same manner as in Example 1.

| | |
|---|---|
| Acrylic copolymer (a-1) | 100 parts |
| Acrylic copolymer (b-1) | 30 parts |
| 60% UVAN 20SE | 40 parts |
| Surface modifier (BYK-300) | 0.1 part |
| Ultraviolet absorber (TINUVIN 900) | 1.0 part |

The above mixture was treated in the same manner as in Example 1.

Comparative Example 2

Clear paint (C-5)

| | |
|---|---|
| Acrylic copolymer (a-4) | 80 parts |
| Acrylic copolymer (b-4) | 80 parts |
| 60% UVAN 20SE | 30 parts |
| Surface modifier (BYK-300) | 0.1 part |
| Ultraviolet absorber (TINUVIN 900) | 1.0 part |

The above mixture was treated in the same manner as in Example 1.

Example 4

Solid color paint (S-1)

| | |
|---|---|
| Titanium White JR-701 (titanium dioxide manufactured by Teikoku Kako) | 100 parts |
| Acrylic copolymer (a-3) | 80 parts |
| Acrylic copolymer (b-2) | 80 parts |
| 60% UVAN 20SE | 30 parts |
| Surface modifier (BYK-300) | 0.1 part |

The above mixture was diluted with SWASOL 1,000 so that the resulting mixture had a viscosity of 25 seconds at 20° C. when measured by Ford cup #4.

Comparative Example 3

Solid color paint (S-2)

| | |
|---|---|
| Titanium White JR-701 | 100 parts |
| Acrylic copolymer (a-4) | 80 parts |
| Acrylic copolymer (b-4) | 80 parts |
| 60% UVAN 20SE | 30 parts |
| Surface modifier (BYK-300) | 0.1 part |

The above mixture was treated in the same manner as in Example 4.

III. Performance tests

(1) Clear paints

An electrophoreticpaint film and an intermediate coat film were formed on a soft steel plate treated with zinc phosphate. Thereon was coated the following metallic paint (film thickness: 20 μ as cured). The coated plate was allowed to stand at room temperature for 5 minutes. Thereon was coated one of the clear paints (C-1) to (C-5) (film thickness: 40 μ as cured). The coated plate was heated at 140° C. for 30 minutes to cure the metallic paint film and the clear paint film. The resulting film was tested for performances, and the results are shown in Table 2.

Metallic paint

| | |
|---|---|
| Acrylic resin (ACRYDIC 47-712 manufactured by DAINIPPON INK & CHEMICALS, INC.) | 100 parts |
| Butyl-etherified methylolmelamine (60% UVAN 20SE) | 60 parts |
| Aluminium paste (ALUMIPAST 55-519 manufactured by TOYO ALUMINUM K.K.) | 10 parts |

The above mixture was diluted with a mixed solvent consisting of 30 parts of SWASOL 1,000 and 70 parts of toluene, so that the resulting mixture had a viscosity of 14 seconds at 20° C. when measured by Ford cup No. 4.

(2) Color paints

An electrophoreticpaint film and an intermediate coat film were formed on a steel plate treated with zinc phosphate. Thereon was coated one of the color paints (S-1) and (S-2) (film thickness: 40μ as cured). The coated plate was heated at 140° C. for 30 seconds to cure the color paint film. The resulting film was tested for performances, and the results are shown in Table 2.

In Table 2 were also shown the proportions of the individual components of each paint.

mersed portion and the non-immersed portion of the film.
X : The film surface shows whitening.

(2) Solvent resistance

About 10 cm distance of a film surface was strongly rubbed by 20 strokes with a gauze impregnated with xylol. Then, the film surface was observed and evaluated according to the following criterion.
◯: The film surface shows no change.
Δ: Scar and delustering are seen slightly.

(3) Adhesion of recoat

A sample was coated and baked at 160° C. for 30 minutes. Then, the same top coat (base coat/clear coat in the case of metallic paint) was coated and baked at 140° C. for 30 minutes. Thereafter, the resulting film was cross-cut to form 100 square portions each of 1 mm × 1 mm, and the peelability of these portions by an adhesive cellophane tape was examined.
◯: No peeling
Δ: Slight peeling
X : Significant peeling

(4) Water resistance

A test plate having a film thereon was immersed in hot water of 40° C. for 240 hours. Then, the plate was water washed, and the film surface was observed and evaluated according to the following criterion.
◯: The film surface shows no change at all.
Δ: The film surface shows slight delustering
X The film surface shows whitening.

(5) Final appearance

Was evaluated visually.
◯: Luster and smoothness are good.
Δ: Luster and smoothness are very slightly inferior
Δ: Luster and smoothness are slightly inferior.
X : Luster and smoothness are very inferior.

TABLE 2

| | Example | | | Comparative Example | | Example | Comparative Example |
|---|---|---|---|---|---|---|---|
| | C-1 | C-2 | C-3 | C-4 | C-5 | S-1 | S-2 |
| Acid resistance (1) | ◯ | ◯ | ◯ | X | ◯ | ◯ | Δ |
| Solvent resistance (2) | ◯ | ◯ | ◯ | ◯ | Δ | ◯ | ◯ |
| Adhesion of recoat (3) | ◯ | ◯ | ◯ | ◯ | ◯ | ◯ | Δ |
| Water resistance (4) | ◯ | ◯ | ◯ | ◯ | ◯ | ◯ | ◯ |
| Final appearance (5) | ◯ | ◯ | ◯ | Ⓐ | X poor compatibility | ◯ | X poor compatibility |
| Impact resistance (6) | 40 | 50 | 45 | 45 | 15 | 50 | 20 |
| (A)/(B) | 1/1 | 1/1.2 | 1/0.7 | 1/0.3 | 1/0.7 | 1/1 | 1/0.7 |
| Carboxyl group/epoxy group (molar ratio) | | | | | | | |
| Content of component (C) in components (A) to (C) (wt. %) | 18 | 20 | 18 | 27 | 18 | 18 | 18 |

Test methods

(1) Acid resistance

A test plate having a paint film thereon was half-immersed in a 40% sulfuric acid solution and allowed to stand at 50° C. for 5 hours. Then, the plate was water washed, and the film surface was observed and evaluated according to the following criterion.
◯: The film surface shows no change at all.
Δ: The film surface shows no change but a slight difference in level is seen at the border between the im-

(6) Impact resistance

Was examined using a Du Pont impact tester (½in., 500 g). Was expressed by a maximum height (5 cm intervals) at which no crack was formed on the film surface of a test plate.

We claim:
1. A thermosetting resin composition comprising as main components
   (A) an acrylic resin containing in the molecule a carboxyl group, a hydroxyl group and an epoxy group and having an acid value of 15-150 mg KOH/g, a hydroxyl value of 30 mg KOH/g or more, an epoxy equivalent of 3,000-15,000 and a number-average molecular weight of 3,000-30,000, (B) an acrylic resin containing in the molecule a carboxyl group, a hydroxyl group and an epoxy group and having an acid value of 2-10 mg KOH/g, a hydroxyl value of 30 mg KOH/g or more, an epoxy equivalent of 250-2,500 and a number-average molecular weight of 3,000-30,000 and (C) an amino resin, wherein the molar ratio of the carboxyl group of the component (A)/the epoxy group of the component (B) is 1/0.5 to 0.5/1 and the amount of the component (C) is 10-40% by weightbased on the total amount of the components (A) to (C).

2. The composition according to claim 1, wherein the acrylic resin (A) has an acid value of 50-120 mg KOH/g.

3. The composition according to claim 1, wherein the acrylic resin (A) has a hydroxyl value of 35-100 mg KOH/g.

4. The composition according to claim 1, wherein the acrylic resin (A) has an epoxy equivalent of 3,200-9,000.

5. The composition according to claim 1, wherein the acrylic resin (A) has a number-average molecular weight of 5,000-20,000.

6. The composition according to claim 1, wherein the acrylic resin (B) has an acid value of 3-9 mg KOH/g.

7. The composition according to claim 1, wherein the acrylic resin (B) has a hydroxyl value of 35-100 mg KOH/g.

8. The composition according to claim 1, wherein the acrylic resin (B) has an epoxy equivalent of 300-1,500.

9. The composition according to claim 1, wherein the acrylic resin (B) has a number-average molecular weight of 5,000-20,000.

10. The composition according to claim 1, wherein the acrylic resins (A) and (B) are each obtained by copolymerizing a carboxyl group-containing monomer, a hydroxyl group-containing monomer, an epoxy group-containing monomer and, as necessary, other copolymerrizable monomer.

11. The composition according to claim 1, wherein the molar ratio of the carboxyl group of the component (A)/the epoxy group of the component (B) is 1/0.6 to 0.6/1.

12. The composition according to claim 1, wherein the amount of the component (C) is 15-30% by weight based on the total amount of the components (A) to (C).

13. The composition according to claim 1 further comprising a curing catalyst.

14. A top coat paint composition for automobiles, which comprises the composition of claim 1 as a main component.

15. An article coated with the composition of claim 1.

* * * * *